US008282821B2

(12) United States Patent
Maier et al.

(10) Patent No.: US 8,282,821 B2
(45) Date of Patent: Oct. 9, 2012

(54) OIL FILTER ASSEMBLY AND ASSOCIATED FILTER ELEMENT

(75) Inventors: Jan Maier, Moessingen (DE);
Friedhelm Pfitzer, Rangendingen (DE);
Alexander Maute, Hechingen-Stetten (DE); Stefan Heinz, Bodelshausen (DE);
Peter Jungmann, Bisingen (DE);
Matthias Knoell, Bad Urach (DE)

(73) Assignee: Joma-Polytec Kunststofftechnik GmbH, Bodelshausen (DE)

( * ) Notice: Subject to any disclaimer, the term of this patent is extended or adjusted under 35 U.S.C. 154(b) by 695 days.

(21) Appl. No.: 12/373,899

(22) PCT Filed: May 19, 2007

(86) PCT No.: PCT/EP2007/004476
§ 371 (c)(1),
(2), (4) Date: Sep. 14, 2009

(87) PCT Pub. No.: WO2008/009324
PCT Pub. Date: Jan. 24, 2008

(65) Prior Publication Data
US 2010/0006493 A1    Jan. 14, 2010

(30) Foreign Application Priority Data

Jul. 21, 2006 (DE) .......................... 10 2006 034 482

(51) Int. Cl.
*B01D 35/16* (2006.01)
*B01D 27/08* (2006.01)
(52) U.S. Cl. ........ 210/232; 210/235; 210/248; 210/443; 210/457

(58) Field of Classification Search ................... 210/232, 210/235, 248, 443, 457
See application file for complete search history.

(56) References Cited

U.S. PATENT DOCUMENTS

| 5,956,822 | A  | * | 9/1999  | Brieden et al. ............... 24/662 |
| 6,558,536 | B2 | * | 5/2003  | Jainek et al. ................. 210/184 |
| 6,685,829 | B1 | * | 2/2004  | Baumann et al. ............. 210/232 |
| 6,811,694 | B2 | * | 11/2004 | Jainek .......................... 210/248 |
| 6,921,479 | B2 | * | 7/2005  | Ardes ........................... 210/232 |
| 2003/0024870 | A1 |   | 2/2003  | Reinhart |

FOREIGN PATENT DOCUMENTS

| DE | 201 18 683   | 3/2003 |
| WO | WO 01/17657  | 3/2001 |

* cited by examiner

*Primary Examiner* — Thomas M Lithgow
(74) *Attorney, Agent, or Firm* — Paul Vincent

(57) ABSTRACT

An oil filter assembly (10) has a receiving chamber (18) that can be closed by a cover element (14) and a spring-loaded supporting tube (22) that is fixed in the receiving chamber and is designed to receive a filter element (20) that can be radially traversed by oil. The supporting tube (22) is axially displaceable between an operating position and a drain position in such a way that, in the operating position when the receiving chamber is closed by the cover element (14), the tube closes a drain opening (42). When the receiving chamber is open in the drain position, the tube releases the drain opening. The supporting tube is mounted to rotate through a rotational angle that is limited by two rotational stops (41, 43) in the housing and the cover element has follower sections (66, 68, 70) that co-operate with the supporting tube and/or filter element to rotate the supporting tube through the rotational angle when the cover element is screwed on and/or unscrewed.

15 Claims, 3 Drawing Sheets

OIL FILTER ASSEMBLY AND ASSOCIATED FILTER ELEMENT

This application is the national stage of PCT/EP2007/00476 filed on May 19, 2007 and claims Parts Convention Priority to DE10 2006 034 482.0 filed Jul. 21, 2006.

BACKGROUND OF THE INVENTION

The invention concerns an oil filter assembly comprising a receiving chamber that is disposed in a housing and can be closed by a cover element that can be screwed on, and a supporting tube that is fixed in the receiving chamber and is spring-loaded in the axial direction for receiving a filter element through which oil can flow in a radial direction, wherein the supporting tube is displaceably disposed in the axial direction between an operating position and a drain position such that, in the operating position, in which the cover element closes the receiving chamber, it closes a drain opening, and in the drain position, when the receiving chamber is opened, it opens a drain opening. In an oil filter assembly of this type, the supporting tube is fixed to the receiving chamber in such a fashion that it remains in the housing when the filter element is exchanged. For spring-loading the supporting tube, a spring element may, in particular, be provided, which loads the supporting tube towards the drain position. The spring element may thereby be supported directly on the supporting tube and also on a housing that forms the receiving chamber.

WO01/17657 A2 (=EP1137470 A2) discloses an oil filter assembly, in which a drain dome is disposed together with a filter insert between a first position in which a drain line is closed, and a second position in which the drain line is opened, such that they can be axially moved, wherein the drain dome is fixed to the filter housing and is urged into its open position by the force of a spring. The drain dome is thereby moved against the action of the spring into its closed position by means of the filter insert that is inserted into the filter housing.

EP 1 106 795 A1 (=DE 600 18 360 T2) discloses a fluid filter having a closing element that is suited to enter into a drain channel when a cover of the filter insert closes the receiving chamber, thereby closing the channel. The closing element, however, opens the drain channel when the filter insert is removed from the receiving chamber. In order to retain the closing element in the operating position, a stop is provided on the filter insert, which cooperates with the closing element to keep it in the operating position when the cover element is closed.

It is the underlying purpose of the present invention to further develop an oil filter assembly of the above-mentioned type. In particular, an oil filter assembly is provided, which can be reliably operated and facilitates exchange of the filter element. The construction of the filter element itself is thereby as simple as possible.

SUMMARY OF THE INVENTION

This object is achieved by an oil filter assembly comprising the features of the independent claim. In the inventive oil filter assembly, the supporting tube is consequently disposed in such a fashion that it can be turned through an angle of rotation that is defined by two rotary stops that are provided on the housing side, wherein the cover element has carrier sections that cooperate with the supporting tube and/or the filter element for turning the supporting tube through the angle of rotation when the cover element is screwed on and/or unscrewed. Its has turned out that, after long-term operation of oil filter assemblies, the supporting tube clogs, in particular, in the area where it closes the drain opening. This causes the supporting tube of conventional devices to remain in the operating position when the cover element is opened in the axial direction. In accordance with the invention, the supporting tube is forced to move through the rotating angle, in particular, when the cover element is unscrewed such that the supporting tube, and in particular, the area of the supporting tube that closes the drain opening becomes detached from the housing. As a result, the supporting tube is finally moved in an axial upward direction into the drain position due to the spring load, which ensures automatic opening of the drain opening.

The rotating angle may, in particular, be within a range of 5° to 90° and, in particular, in a range of 10° to 30°. A rotating area of approximately 15° has proven to be optimum in order to ensure that the area of the supporting tube that closes the drain opening can be released.

Connecting pins may be provided for movably fixing the supporting tube in the receiving chamber, which extend in the axial direction, in particular in the area of the bottom of the receiving chamber, and engage in pin recesses on the supporting tube side, whereby the areas that are disposed opposite to each other and coaxially along the center longitudinal axis of at least one pin recess form the rotary stops. The pin recesses may thereby be formed, in particular, like ring segments coaxially about the center longitudinal axis. Advantageously, at least two mutually facing ring-segment-like pin recesses are provided, wherein the respective opposite ends of a pin recess form the rotary stops.

The connecting pins may have a widening in the area of their free ends, wherein the lower edge of the widening forms an axial stop for the supporting tube in the drain position of the supporting tube. Connecting pins of this type are consequently used as rotary stops of a defined rotation about the center longitudinal axis and as axial stops of the spring-loaded supporting tube in the drain position.

The widenings may thereby be produced, in particular, through hot riveting after insertion of the supporting tube and thereby of the pin recesses into the connecting pins. It is, however, also feasible to form the widenings as detents that engage behind the respective pin recesses. The supporting tube may e.g. be introduced in the axial direction into the receptacle for mounting, wherein the detents then engage behind the pin recesses in the assembly position. The housing is advantageously formed from plastic material, wherein the connecting pins are advantageously formed on the housing.

The pin recesses are thereby advantageously disposed on feet that project in a radially outward direction or on a collar of the supporting tube that projects in a radially outward direction and is circumferential at least in sections.

The carrier sections of the cover element, which carry along the filter element, may be formed, in particular, as ribs that project in a radially inward direction and/or as webs that project in an axially downward direction. The ribs or webs may then engage directly on the supporting tube depending on the design of the invention, or the carrier sections may also engage directly on the filter element, wherein the supporting tube is then rotated about its center longitudinal axis via the filter element.

The cover element may also have a supporting tube abutment area on its side facing the receiving chamber such that, when the filter element is disposed on the supporting tube, the supporting tube is directly loaded by the supporting tube abutment area and displaced into the operating position when the receiving chamber is being closed. In contrast to prior art, the supporting tube is consequently immediately brought into the operating position directly by the cover element, via its supporting tube abutment area, when the cover is being closed. The supporting tube is thereby displaced into the operating position directly via the cover element that acts against the supporting tube and not via the filter element. This is advantageous in that the filter element itself does not need to have a high intrinsic rigidity and may therefore have a relatively simple construction. In particular, the filter element does not require any components that transmit forces in the axial direction. Prior art devices have shown that, when filter elements are used on a long-term basis, their intrinsic rigidity in the axial direction can decrease, which could cause the supporting tube to be unintentionally displaced into the drain position. In accordance with the invention, it is therefore decisive that the filter element does not retain the supporting tube in its operating position.

The cover element may moreover have a supporting tube abutment area on its side facing the receiving chamber such that, when the filter element is disposed on the supporting tube and the receiving chamber is closed, the supporting tube abutment area directly keeps the supporting tube in the operating position. The supporting tube abutment area consequently keeps the supporting tube in its operating position during operation of the oil filter assembly. This is also advantageous in that, during operation of the oil filter assembly, the filter element does not have to transmit any axial forces in order to keep the supporting tube in the operating position. In this respect, the construction of the filter element is facilitated compared to conventional oil filter assemblies.

The supporting tube may naturally have functional components at its free end, wherein the functional components of the supporting tube then cooperate with the carrier sections and/or the supporting tube abutment area. One suitable functional component is, in particular, an overpressure valve that opens when the filter element is clogged and the pressure consequently increases in the area of the unfiltered oil side. The oil can then pass the oil filter assembly without being filtered.

For an advantageous cooperation between the supporting element and the cover element during closing or opening of the receiving chamber, or when the receiving chamber is closed, the supporting tube may project in the direction towards the cover when the filter element is disposed on the supporting tube. This forms an advantageous engagement surface for the supporting tube abutment area of the cover.

In accordance with a further embodiment of the invention, the cover element may have a filter element abutment area such that the filter element is displaced directly by the filter element abutment area into an operating position on the supporting tube while the receiving chamber is closed. If the filter element is not pushed far enough onto the supporting tube when the filter element is changed, the supporting tube is displaced into its operating position when the receiving chamber is closed. When the cover is closed, the filter element is in its operating position, and in the operating position of the supporting tube, it is preferably disposed such that substantially no axial forces are transmitted via the filter element.

It is thereby feasible for the supporting tube abutment area and the filter element abutment area to be located in different planes in the axial direction and/or for the supporting tube abutment area to be disposed on the cover element in a radial further inward position than the filter element abutment area. This is advantageous in that the supporting tube abutment area is provided in the cover element at a clear separation from the filter element abutment area.

The supporting tube abutment area may thereby be formed, in particular, by end faces, facing the supporting tube, of webs or longitudinal ribs that extend in the axial direction in the inside of the cover. This is advantageous in that, when an overpressure valve is disposed at the free end of the supporting tube, oil can flow between the webs or longitudinal ribs to the inlet of the overpressure valve.

The filter element abutment area may also be formed by correspondingly designed webs or ribs that are disposed on the cover and project in a radially inward direction such that oil can flow around the filter element between these ribs and can reach the valve inlet of the overpressure valve.

It is thereby particularly feasible that the supporting tube abutment area and/or the filter element abutment area is/are formed by the carrier sections or by the ribs or webs forming the carrier sections.

Moreover, recesses or elevations that cooperate with the carrier sections on the cover side may be provided, in particular, at the free end of the supporting tube facing the cover element, which ensure a limited rotation of the supporting tube when the cover element is rotated. The recesses and/or elevations may thereby, in particular, have a wedge-like shape and project in an axial direction and/or in a radial direction.

The invention also concerns a filter element for an inventive oil filter assembly, which has recesses or elevations at one end cap, i.e. that end cap that cooperates with the cover element, the recesses or elevations cooperating with the carrier sections on the cover side when the cover element is turned. The recesses or elevations may thereby have, in particular, a wedge shape to ensure that the filter element is also rotated in the corresponding direction.

In accordance with a further embodiment of the invention, the supporting tube may have an extension section on the side facing away from the cover element and in the area that is not covered by the filter element, which is closed in the radial direction, engages in a purified oil space having an oil outlet, and has at least one purified oil outlet opening in its area facing away from the cover element. Purified oil filtered by the filter element may consequently be discharged through the extension section of the supporting tube into the purified oil chamber and from there into the oil outlet.

The area of the supporting tube that is covered by the filter element has openings in the radial direction through which purified oil filtered by the filter element can flow into the supporting tube. The filter element is thereby advantageously supported on the supporting tube in a directly sealing fashion in the area of its end caps.

A circumferential sealing collar that projects in the radial direction may be formed on the extension section for sealing the purified oil chamber with respect to the receiving chamber that receives the unfiltered crude oil.

A closing section, which is disposed in the area of the center longitudinal axis for closing the drain opening in the operating position, may advantageously be provided at the free end of the extension section of the supporting tube. The spring element, which loads the supporting tube into the drain position, may thereby be disposed around the extension section of the supporting tube in the purified oil chamber.

Further details and advantageous embodiments of the invention can be extracted from the following description by means of which the embodiments shown in the figures are described and explained in more detail.

DESCRIPTION OF THE PREFERRED EMBODIMENT

Figure 1:
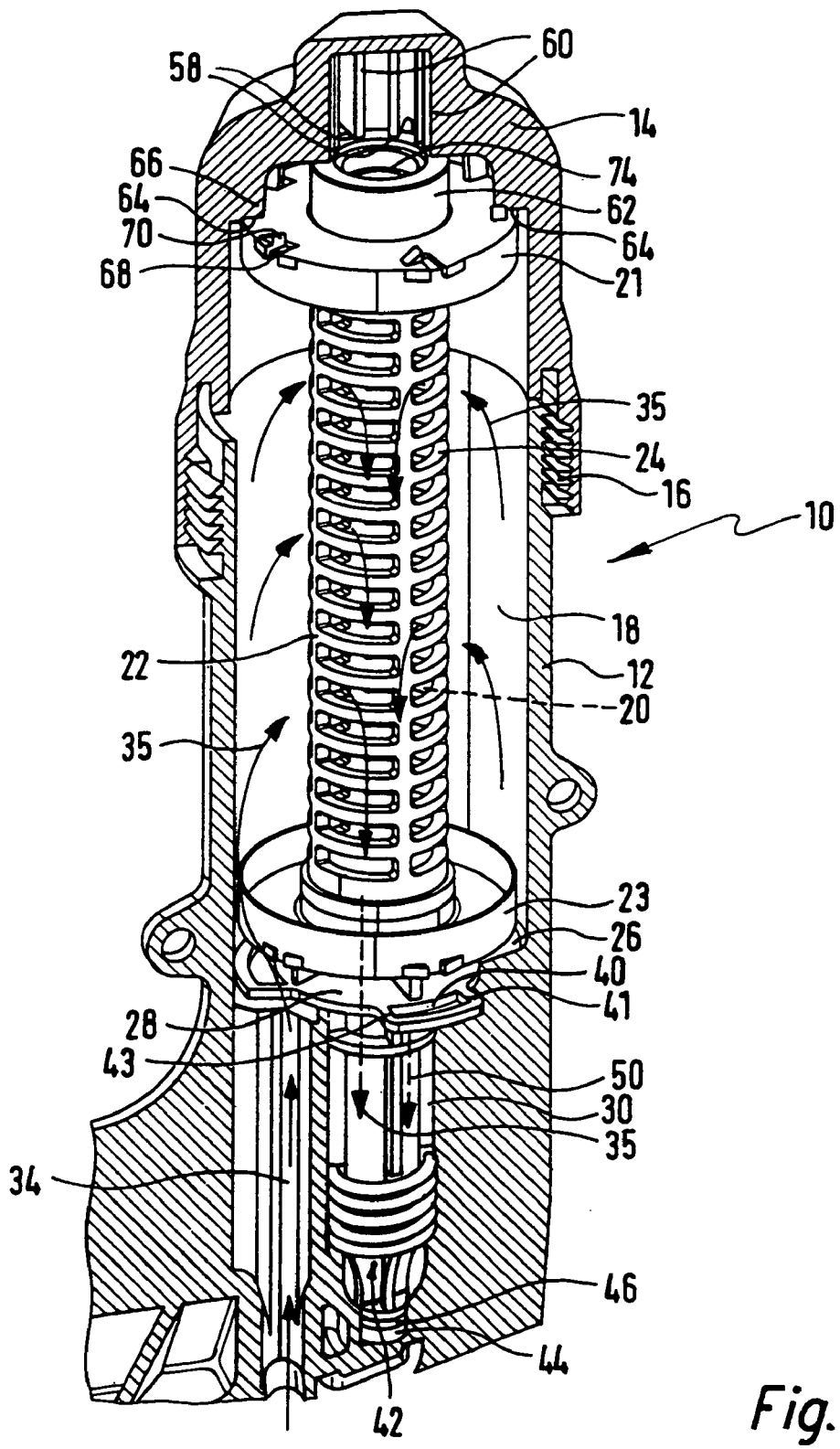
FIG. 1 shows a longitudinal open view of a first oil filter assembly in accordance with the invention.
Figure 2:
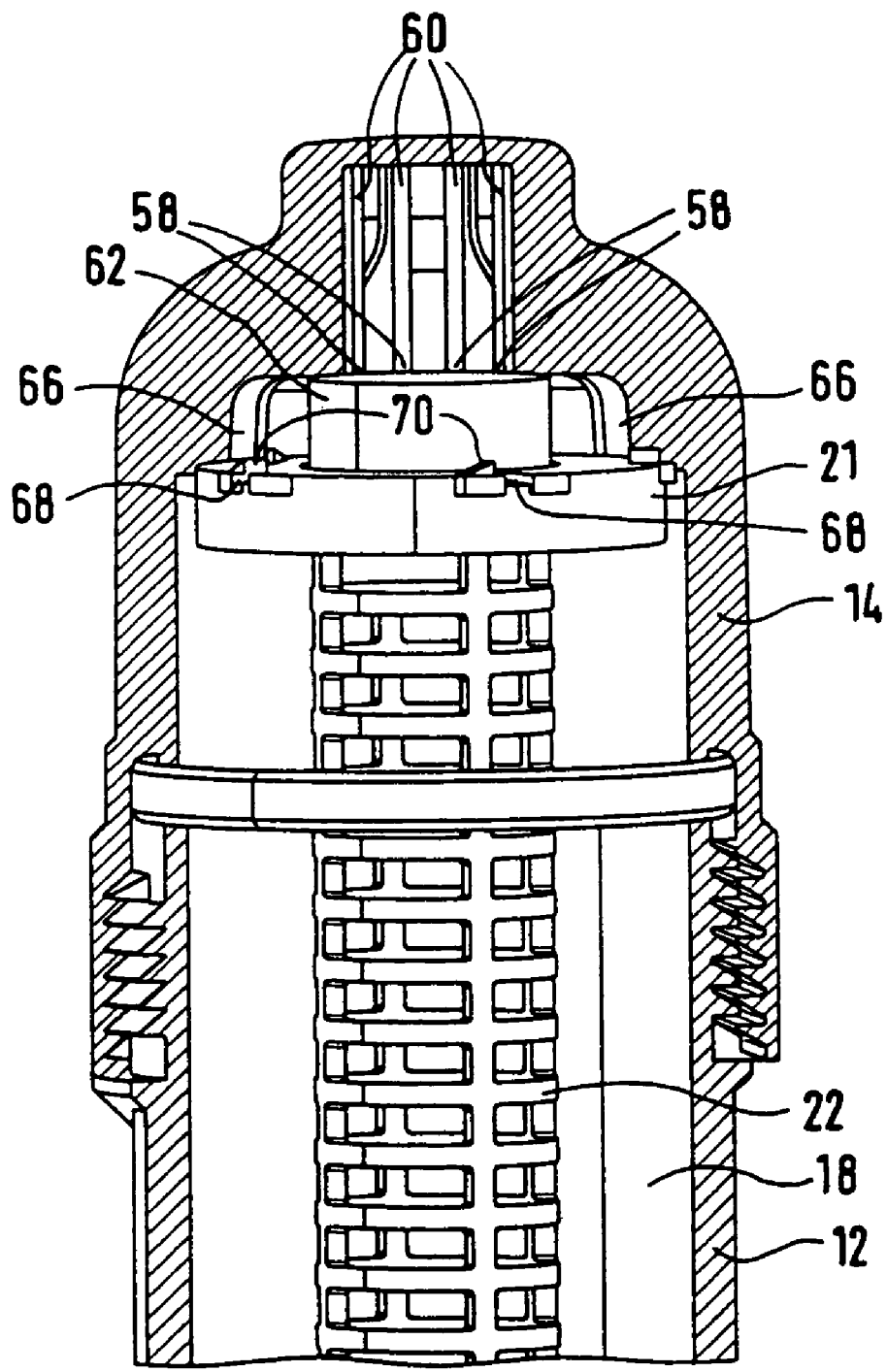
FIG. 2 shows a longitudinal open view of the upper part of the oil filter assembly in accordance with FIG. 1.

The oil filter assembly 10 shown in FIGS. 1 through 4 comprises a housing 12 that can be closed by a cover 14 via a thread 16. The housing 12 and the cover 14 form a receiving chamber 18 that houses a filter element 20 through which oil can flow in a radial direction. FIGS. 1 and 2 only show the two end caps 21, 23 of the filter element 20 for clear illustration of the function. The filter element 20 is supported by a supporting tube 22 which is can-shaped in the area where it is covered by the filter element 20. A plurality of openings 24 are provided on the supporting tube such that oil can flow through the supporting tube 22 in a radial direction. On its side facing a bottom 26 of the receiving chamber 18, the supporting tube comprises a circumferential annular collar 28 that is oriented in a radially outward direction. It is also possible to merely provide annular collar sections or feet instead of the annular collar 28.

A purified oil chamber 30 is provided downstream of the receiving chamber 18 in an axial downward direction, the axial end of which comprises an oil outlet 32. An oil inlet 34 extends within the housing 12 parallel to the purified oil chamber 30, as is clearly illustrated, in particular, in FIGS. 1 and 3, through which unfiltered crude oil can flow into the receiving chamber 18. The oil flow during operation of the oil filter assembly 10 is indicated by arrows 35 in FIG. 1. During operation of the oil filter assembly 10, oil to be filtered consequently flows from the oil inlet 34 through the filter element 20 and to the oil outlet 32.

The supporting tube 22 is inserted in the axial direction from the top into the receiving chamber 18 and permanently fixed at that location. Towards this end, axially extending connecting pins 38 are provided in the area of the bottom 26, which is clearly shown, in particular, in FIGS. 3 and 4. In the assembled state, these connecting pins 38 project into pin recesses 40 that are provided on the annular collar 28. As is clearly shown in FIG. 1, these pin recesses 40 are formed as ring segments. For mounting the supporting tube 22, it is introduced in an axial direction into the receiving chamber such that the connecting pins 38 are immersed into the pin recesses 40, as is illustrated in FIG. 4.

Figure 3:
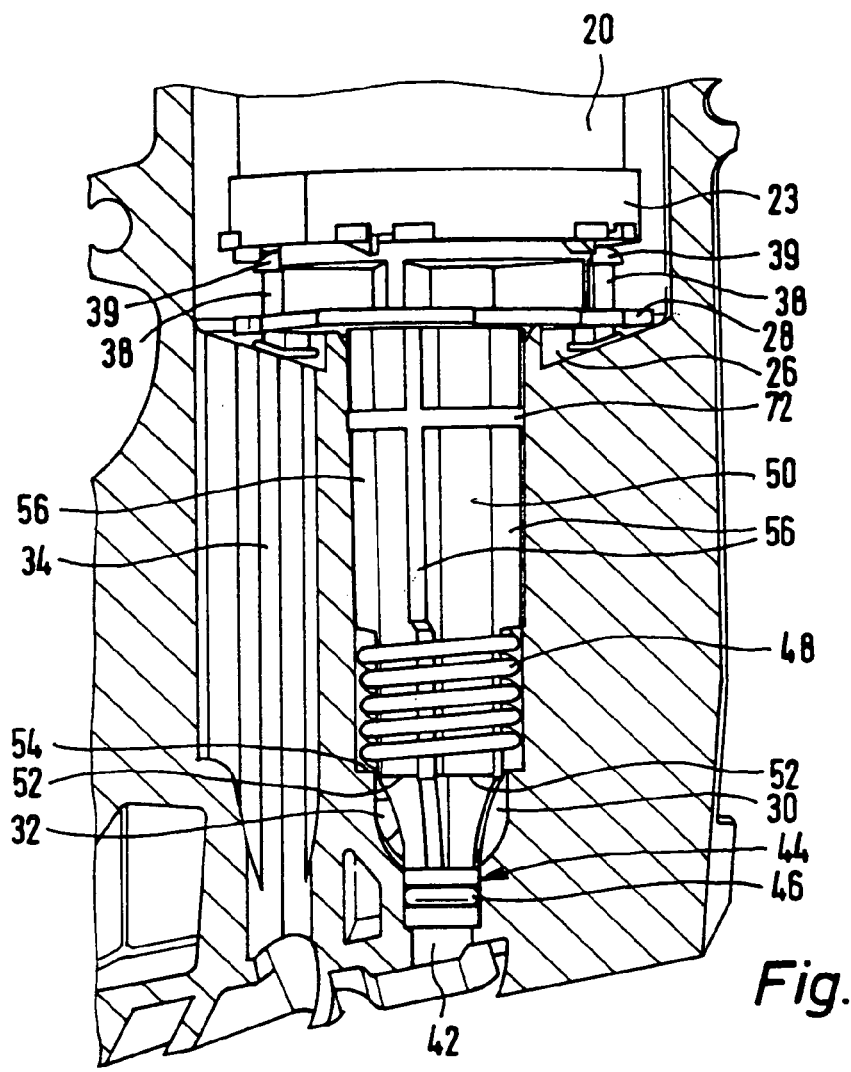
FIG. 3 shows a longitudinal open view of the lower part of the oil filter assembly in accordance with FIG. 1.

After insertion of the supporting tube 22, the free ends of the connecting pins 38 are e.g. thermally deformed to produce mushroom-like widenings 39 at their free ends, which are clearly shown in FIG. 3. The separation between the bottom 26 of the receiving chamber 18 and the lower edge of the widening 39 is thereby selected such that the supporting tube 22 can be displaced from the operating position shown in FIGS. 1 through 4 to a drain position, in which the areas of the annular collar 28 that surround the recesses 40 come to rest on the lower side of the recesses. In the operating position, a drain opening 42 provided at the lower end of the purified oil chamber 30 is closed by a closing section 44 of the supporting tube 22. The closing section 44 has a circumferential seal 46.

When the cover element 14 is removed, the supporting tube 22 is displaced into the drain position by a spring element 48 that is supported on the housing 12 and also on the supporting tube 22. In the drain position, the areas of the annular collar 28 that surround the recess 40 abut the lower sides of the widenings 39, and the closing section 44 is also moved from the area of the drain opening 42, such that oil can flow out of the receiving chamber 18 via the drain opening 42.

Figure 4:
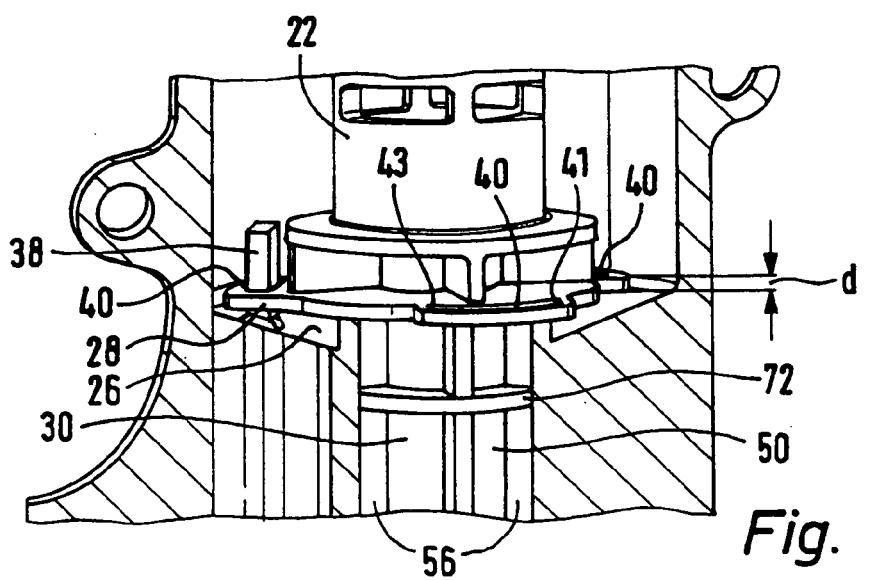
FIG. 4 shows an open view in correspondence with FIG. 3 in an assembly position.

As is clearly shown in FIGS. 1, 3 and 4, the supporting tube has an extension section 50 on the side facing away from the cover element 14, which is closed in the radial direction and engages the purified oil chamber 30. The extension section 50 thereby has a purified oil outlet opening 52 on its side facing away from the cover element 16, from which filtered purified oil can flow into the purified oil chamber 30. The filtered purified oil consequently flows from the purified oil outlet opening 52 through the purified oil chamber 30 to the oil outlet 32 that follows the purified oil chamber 30 in the radial direction.

As is particularly shown in FIG. 3, the spring element 48 is supported on a shoulder 54 on the purified oil chamber side and also on the end faces of webs 56 of the extension section 50, which extend in the axial direction.

As mentioned above, the supporting tube 22 is in a drain position when the cover element 14 is opened due to the spring pretension of the spring element 48. In order to transfer the supporting tube 22 together with the filter element 20 that is disposed on the supporting tube 22 into the operating position when the cover element 14 is unscrewed, the cover element 14 has a supporting tube abutment area 58 on its side facing the receiving chamber 18. The supporting tube abutment area 58, which is clearly shown, in particular, in FIGS. 1 and 2, is thereby formed by ribs 60 that are disposed on the inside of the cover element and project in a radial inward direction. The end faces of the ribs 60 that extend in the radial direction thereby load the end face of the free end 62 of the supporting tube 22. As is shown in particular in FIG. 2, in the operating position, the supporting tube 22 or its free end 62 projects past the filter element 20 or its end cap 21 in an axial direction towards the cover. The supporting tube abutment area 58 also ensures that the supporting tube 22 is held in the operating position when the cover element 14 is closed.

The supporting tube abutment areas 58 are provided on the cover element 14 to ensure that the filter element 20 advantageously does not need to transmit any axial forces, in particular, in the operating position. The load flow that starts from the spring element 48 extends via the supporting tube 22 into the cover element 14.

Filter element abutment areas 64 are provided on the inner side of the cover element 14 in order to dispose the filter element 20 at an exact position on the supporting tube 22. The filter element abutment areas 64 are used to displace the filter element 20 into its operating position when the cover element 14 is screwed on. The filter element abutment areas 64 are thereby also realized by correspondingly disposed ribs 66. The supporting tube abutment areas 58 are, however, disposed radially further inward than the filter element abutment areas 64. The supporting tube abutment areas 58 are located in the axial direction above the filter element abutment areas 64.

After long-term operation of the oil filter assembly, the sealing element 46 or the closing section 44 may stick to the housing. In order to release a stuck closing section 44 or sealing element 46 for opening the cover element, the ribs 60 and/or the ribs 66 are formed as carrier sections or carrier ribs that also rotate the supporting tube 22 and/or the filter element 20 when the cover element 14 is turned. The angle of rotation of the supporting tube 22, which may, in particular, be approximately 15°, is determined by the length of the pin recesses 40 that extend coaxially to the center longitudinal axis. The coaxial opposite sides of the pin recesses 40 thereby form rotary stops 41, 43 for the connecting pins 38 that engage in the pin recesses 40. A stuck supporting tube 20 can be released by turning, thereby enabling automatic axial movement of the supporting tube 22. In order to also rotate the supporting tube 22 or the filter element 20, carrier recesses 68 or, in particular, wedge-like carrier elevations 70 (shown as example on the end discs 21 and 23) may be provided on the supporting tube 22 or on the filter element 20. The carrier recesses 68 or carrier elevations 70 may extend in the radial and also in the axial direction. They may also be additionally or exclusively provided in the area of the free end 62 of the supporting tube 22. In particular, when a filter element is used, which transmits forces only to a limited degree, the carrier recesses or carrier elevations, which cooperate with the ribs or webs provided on the cover side, are exclusively provided on the supporting tube 22.

In order to prevent undesired flow of unfiltered oil from the receiving chamber 18 along the extension section 50 towards the purified oil chamber 30, a circumferential sealing collar 72 is formed on the extension section 50. The sealing collar 52 thereby acts against the wall of the purified oil chamber 30. The sealing collar 72 is thereby disposed such that it leaves the area of the wall of the purified oil chamber when the supporting tube 22 is axially displaced into the drain position such that purified oil provided in the receiving chamber 18 can freely flow into the purified oil chamber 30 and be discharged from the purified oil chamber 30 via the drain opening 42.

An overpressure valve 74 is disposed at the free end 62 of the supporting tube 22 facing the cover element 14 (clearly shown in particular in FIG. 1) and opens when the pressure in the receiving chamber 18 is increased such that unfiltered oil can flow into the inner side of the supporting tube 22. Due to the supporting tube abutment areas 58 that are formed as ribs 60, oil can freely flow between the ribs 60 towards the inlet of the overpressure valve 74. Since the filter element abutment areas 64 are also formed like ribs, oil can also freely flow between the filter element 20 and the cover 14 to the valve 74.

We claim:

1. An oil filter assembly having a filter element through which oil can flow in a radial direction, the assembly comprising;
    a housing defining a receiving chamber, said housing having two rotary stops, a drain opening and means for spring loading;
    a supporting tube fixed in said receiving chamber and disposed, structured and dimensioned for supporting the filter element, said supporting tube spring loaded in an axial direction by said spring loading means, said supporting tube disposed, structured and dimensioned for rotation through an angle of rotation defined by said two rotary stops; and
    a cover element screwed onto said housing, said cover element having carrier sections cooperating with said supporting tube and/or the filter element for rotating said supporting tube through said angle of rotation when said cover element is screwed onto and/or unscrewed from said housing, wherein said supporting tube is disposed for displacement in said axial direction between an operating position and a drain position, wherein, in said operating position, said drain opening position is closed when said receiving chamber is closed by said cover element and, in said drain position, said drain opening is opened when said receiving chamber is opened.

2. The oil filter assembly of claim 1, wherein said angle of rotation is in a range between 5° and 90° or in a range between 10° and 30°.

3. The oil filter assembly of claim 1, wherein said rotary stops comprise connecting pins disposed proximate to a bottom of said receiving chamber and extending in said axial direction to engage in pin recesses cooperating with said supporting tube, wherein said pin recesses are disposed opposite to each other coaxially about a center longitudinal axis of said housing.

4. The oil filter assembly of claim 3, wherein said connecting pins have a widening in a area of free ends thereof, wherein a lower edge of said widening forms an axial stop for said supporting tube in said drain position.

5. The oil filter assembly of claim 4, wherein said widening is produced through hot riveting after insertion of said supporting tube and thereby of said pin recesses onto said connecting pins.

6. The oil filter assembly of claim 4, wherein said widening is formed as a detent that engages behind a respective pin recess.

7. The oil filter assembly of claim 3, wherein said pin recesses are disposed on feet, which project in a radial outward direction, or on a collar of said supporting tube, which projects in a radial outward direction and is circumferential at least in sections.

8. The oil filter assembly of claim 1, wherein said carrier sections are formed as webs or ribs that project in a radially inward direction and/or an axially downward direction.

9. The oil filter assembly of claim 1, wherein said cover element has a supporting tube abutment area on a side thereof facing said receiving chamber, wherein, when the filter element is disposed on said supporting tube, said supporting tube is directly loaded by said supporting tube abutment area and is displaced into said operating position when said receiving chamber is being closed or, when the filter element is disposed on said supporting tube and said receiving chamber is closed, said supporting tube abutment area directly keeps said supporting tube in said operating position.

10. The oil filter assembly of claim 9, wherein said supporting tube projects past the filter element in a direction towards said cover element when said receiving chamber is closed and the filter element is disposed on said supporting tube.

11. The oil filter assembly of claim 10, wherein said cover element has a filter element abutment area on a side thereof facing said receiving chamber, wherein the filter element is directly displaced by said filter element abutment area into said operating position while said receiving chamber is being closed.

12. The oil filter assembly of claim 11, wherein said supporting tube abutment area and said filter element abutment area are located at different planes in said axial direction and/or said supporting tube abutment area is disposed on said cover element at a radially further inward position than said filter element abutment area.

13. The oil filter assembly of claim 9, wherein said supporting tube abutment area and/or said filter element abutment area are formed by said carrier sections.

14. The oil filter assembly of claim 1, wherein a free end of said supporting tube facing said cover element has recesses or elevations which cooperate with said carrier sections when said cover element is turned.

15. A filter element that can be inserted into the oil filter assembly of claim 1, at least one end cap of which has recesses or elevations for cooperation with said carrier sections when said cover element is turned.

* * * * *